US012581265B2

(12) United States Patent
Mizuno et al.

(10) Patent No.: US 12,581,265 B2
(45) Date of Patent: Mar. 17, 2026

(54) INFORMATION PROCESSING METHOD, INFORMATION PROCESSING DEVICE, AND RECORDING MEDIUM

(71) Applicant: Panasonic Intellectual Property Corporation of America, Torrance, CA (US)

(72) Inventors: Ko Mizuno, Osaka (JP); Tomokazu Ishikawa, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 180 days.

(21) Appl. No.: 18/243,199

(22) Filed: Sep. 7, 2023

(65) Prior Publication Data

US 2023/0421988 A1 Dec. 28, 2023

Related U.S. Application Data

(63) Continuation of application No. PCT/JP2022/003588, filed on Jan. 31, 2022.

(Continued)

(30) Foreign Application Priority Data

Nov. 30, 2021 (JP) ................................ 2021-194053

(51) Int. Cl.
*H04S 7/00* (2006.01)

(52) U.S. Cl.
CPC .......... *H04S 7/304* (2013.01); *H04S 2400/11* (2013.01); *H04S 2400/13* (2013.01)

(58) Field of Classification Search
CPC .......... H04S 7/303; H04S 7/304; H04S 1/002; H04S 7/306; H04S 2400/11; H04S 2400/13; H04S 2420/01

(Continued)

(56) References Cited

U.S. PATENT DOCUMENTS

2005/0271212 A1* 12/2005 Schaeffer .................. H04S 7/30 381/17
2017/0364752 A1* 12/2017 Zhou .................... G06V 10/462

(Continued)

FOREIGN PATENT DOCUMENTS

| | | |
|---|---|---|
| JP | 2017-175356 | 9/2017 |
| JP | 2020-524420 | 8/2020 |

(Continued)

OTHER PUBLICATIONS

International Search Report issued Apr. 19, 2022 in International (PCT) Application No. PCT/JP2022/003588.

(Continued)

*Primary Examiner* — Paul Kim

(74) *Attorney, Agent, or Firm* — Wenderoth, Lind & Ponack, L.L.P.

(57) ABSTRACT

An information processing method includes: obtaining a stream including (i) first position and orientation information indicating a position and an orientation of a sound source and (ii) a sound signal indicating a sound that the sound source outputs; obtaining second position and orientation information indicating a position and an orientation of a head of a user; and setting a spatial resolution for three-dimensional audio processing to be performed on the sound signal, according to a positional relationship between the head of the user and the sound source and using the first position and orientation information and the second position and orientation information.

11 Claims, 6 Drawing Sheets

Related U.S. Application Data

(60) Provisional application No. 63/161,499, filed on Mar. 16, 2021.

(58) Field of Classification Search
USPC .......................................................... 381/303
See application file for complete search history.

(56) References Cited

U.S. PATENT DOCUMENTS

| | | | | |
|---|---|---|---|---|
| 2019/0020968 | A1 | 1/2019 | Suenaga et al. | |
| 2020/0094141 | A1 | 3/2020 | Fersch et al. | |
| 2020/0227052 | A1 * | 7/2020 | Breebaart | H04L 65/80 |

FOREIGN PATENT DOCUMENTS

| | | |
|---|---|---|
| KR | 10-2019-0060464 | 6/2019 |
| WO | 2018/232327 | 12/2018 |

OTHER PUBLICATIONS

Extended European Search Report issued Sep. 4, 2024 in European Patent Application No. 22770897.1.

* cited by examiner

| D | Less than 1 m | 1 m to 3 m | 3 m to 20 m | More than or equal to 20 m |
|---|---|---|---|---|
| Spatial resolution | 10 degrees | 30 degrees | 45 degrees | 90 degrees |
| Time response length | 10 ms | 50 ms | 200 ms | 1 s |

| D | Less than 1 m | 1 m to 3 m | 3 m to 20 m | More than or equal to 20 m |
|---|---|---|---|---|
| Spatial resolution | 5 degrees | 15 degrees | 22.5 degrees | 45 degrees |

| D | Less than 1 m | 1 m to 3 m | 3 m to 20 m | More than or equal to 20 m |
|---|---|---|---|---|
| Spatial resolution | 20 degrees | 60 degrees | 90 degrees | 180 degrees |

INFORMATION PROCESSING METHOD, INFORMATION PROCESSING DEVICE, AND RECORDING MEDIUM

CROSS REFERENCE TO RELATED APPLICATIONS

This is a continuation application of PCT International Application No. PCT/JP2022/003588 filed on Jan. 31, 2022, designating the United States of America, which is based on and claims priority of U.S. Provisional Patent Application No. 63/161,499 filed on Mar. 16, 2021 and Japanese Patent Application No. 2021-194053 filed on Nov. 30, 2021. The entire disclosures of the above-identified applications, including the specifications, drawings and claims are incorporated herein by reference in their entirety.

FIELD

The present disclosure relates to an information processing method, an information processing device, and a recording medium.

BACKGROUND

Techniques that perform processing (also called three-dimensional audio processing) on sound signals to be output according to the position and orientation of a sound source and the position and orientation of a user who is a hearer to enable the user to experience three-dimensional sounds have been known (see Patent Literature (PTL) 1).

CITATION LIST

Patent Literature

PTL 1: Japanese Unexamined Patent Application Publication (Translation of PCT Application) No. 2020-524420

SUMMARY

Technical Problem

However, the above-described three-dimensional audio processing requires a relatively large scale of computations, and may cause a delay in an output sound depending on a time required for the computations.

In view of the above, the present disclosure provides an information processing method, an information processing device, etc. which prevent a delay that may occur in an output sound.

Solution to Problem

An information processing method according to one aspect of the present disclosure includes: obtaining a stream including (i) first position and orientation information indicating a position and an orientation of a sound source and (ii) a sound signal indicating a sound that the sound source outputs; obtaining second position and orientation information indicating a position and an orientation of a head of a user; and setting a spatial resolution for three-dimensional audio processing to be performed on the sound signal, according to a positional relationship between the head of the user and the sound source and using the first position and orientation information and the second position and orientation information.

Note that these comprehensive or specific aspects may be implemented by a system, a device, an integrated circuit, a computer program, or a recording medium such as a computer-readable CD-ROM, or by any optional combination of systems, devices, integrated circuits, computer programs, and recording media.

Advantageous Effects

An information processing method according to the present disclosure can prevent a delay that may occur in an output sound.

BRIEF DESCRIPTION OF DRAWINGS

These and other advantages and features will become apparent from the following description thereof taken in conjunction with the accompanying Drawings, by way of non-limiting examples of embodiments disclosed herein.

Figure 1:
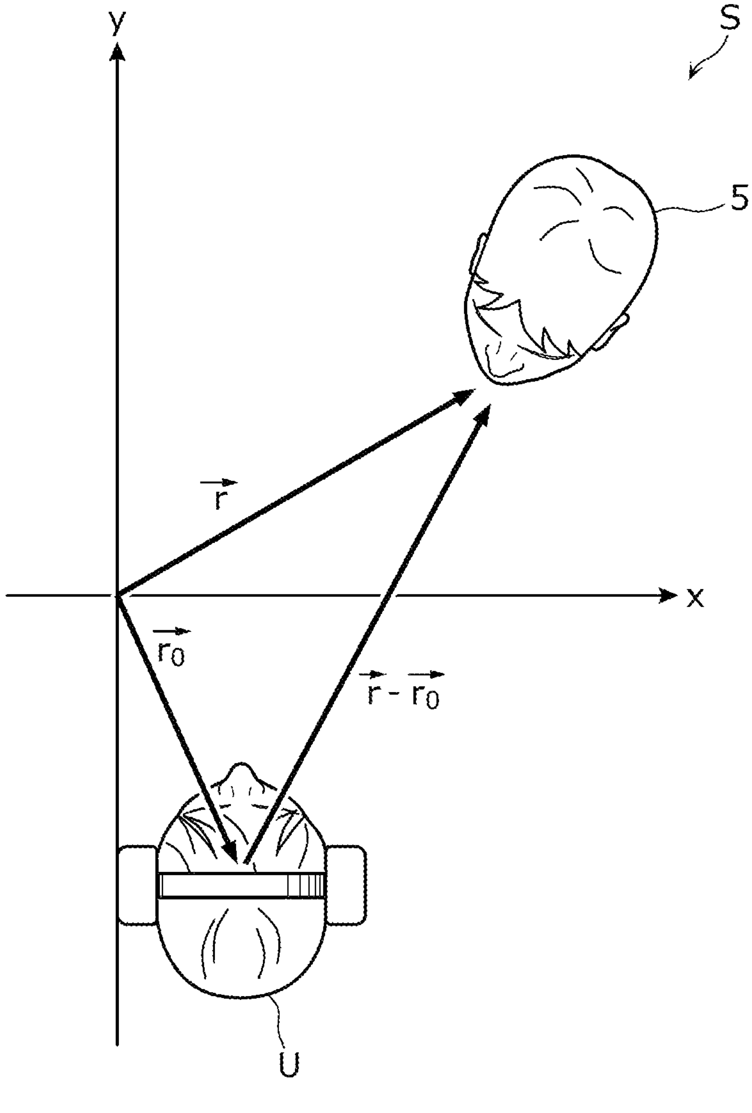
FIG. 1 is a diagram illustrating an example of a positional relationship between a user and a sound source according to an embodiment.

DESCRIPTION OF EMBODIMENT (Underlying Knowledge Forming Basis of the Present Disclosure)

The inventors of the present application have found occurrences of the following problems relating to the three-dimensional audio processing described in the "Background Art" section.

The three-dimensional audio processing technique disclosed by PTL 1 obtains future predicted pose information based on the orientation of a user, and renders media content in advance using the predicted pose information.

However, the above-described three-dimensional audio processing technique produces an advantageous effect only when a change in the orientation of a user is relatively small or consistent. Since the predicted orientation information and orientation information on the actual orientation of a user do not match in cases other than the foregoing cases, the position of a sound image may become inappropriate for the user or may abruptly change.

As described above, the technique disclosed by PTL 1 may not be able to solve a problem of a delay that may occur in an output sound depending on a time required for computations performed in three-dimensional audio processing.

In order to provide a solution to a problem as described above, an information processing method according to one aspect of the present disclosure includes: obtaining a stream including (i) first position and orientation information indicating a position and an orientation of a sound source and (ii) a sound signal indicating a sound that the sound source outputs; obtaining second position and orientation information indicating a position and an orientation of a head of a user; and setting a spatial resolution for three-dimensional audio processing to be performed on the sound signal, according to a positional relationship between the head of the user and the sound source and using the first position and orientation information and the second position and orientation information.

According to the above-described aspect, the scale of computations required for three-dimensional audio processing can be adjusted since a spatial resolution for the three-dimensional audio processing is set according to a positional relationship between the head of a user and a sound source. For this reason, when the scale of computations required for the three-dimensional audio processing is relatively large, the spatial resolution is decreased to reduce the scale of computations and a time required for performing the three-dimensional audio processing. As a result, a delay that may occur in an output sound can be prevented. As described above, the above-described information processing method can prevent a delay that may occur in an output sound.

For example, in the setting of the spatial resolution, the spatial resolution may be set lower for a larger distance between the head of the user and the sound source.

According to the above-described aspect, a spatial resolution for the three-dimensional audio processing is set lower for a larger distance between the head of a user and a sound source to reduce the scale of computations required for the three-dimensional audio processing. As a result, a delay that may occur in an output sound can be prevented. As described above, the information processing method can more readily prevent a delay that may occur in an output sound.

For example, the stream may further include type information indicating whether the sound indicated by the sound signal is a human voice or not. In the setting of the spatial resolution, the spatial resolution may be increased when the type information indicates that the sound indicated by the sound signal is a human voice.

According to the above-described aspect, a spatial resolution for the three-dimensional audio processing to be performed on a human voice is increased to enable a user to hear the human voice in higher quality as compared to a sound other than a human voice. This may contribute to improvement in accuracy of a sound image position of a human voice, since it is likely that a sound image position of a human voice is required to have relatively high accuracy as compared to a sound other than a human voice. As described above, the information processing method can prevent a delay that may occur in an output sound, while improving the quality of a human voice included in the output sound.

For example, the stream may further include type information indicating whether the sound indicated by the sound signal is a human voice or not. In the setting of the spatial resolution, the spatial resolution is decreased when the type information indicates that the sound indicated by the sound signal is not a human voice.

According to the above-described aspect, a spatial resolution for the three-dimensional audio processing is decreased for the three-dimensional audio processing to be performed on a sound other than a human voice to reduce the scale of computations required for the three-dimensional audio processing to be performed on a sound other than a human voice. As a result, a delay that may occur in an output sound can be prevented. A reduction in accuracy of a sound image position of a sound other than a human voice may contribute to prevention of a delay that may occur in an output sound, since it is unlikely that the sound image position of a sound other than a human voice is required to have high accuracy as compared to a human voice. As described above, the information processing method can more readily prevent a delay that may occur in an output sound.

For example, the stream may include the first position and orientation information and the sound signal of each of one or more sound sources. The one or more sound sources each is the sound source. In the setting of the spatial resolution, the spatial resolution may be set lower for a greater number of the one or more sound sources.

According to the above-described aspect, a spatial resolution is set lower for a greater number of sound sources included in a stream to reduce the scale of computations required for the three-dimensional audio processing. As a result, a delay that may occur in an output sound can be prevented. As described above, the information processing method can more readily prevent a delay that may occur in an output sound.

For example, a time response length for the three-dimensional audio processing may be set according to the positional relationship.

According to the above-described aspect, it is possible to cause a user to appropriately detect a distance from the user to the sound source since a time response length for the three-dimensional audio processing is set according to a positional relationship between the head of a user and a sound source. As described above, the information processing method can prevent a delay that may occur in an output sound, while causing a user to appropriately detect a distance from the user to a sound source.

For example, in the setting of the time response length, the time response length may be set greater for a larger distance between the head of the user and the sound source.

According to the above-described aspect, a time response length for the three-dimensional audio processing is set greater for a larger distance between the head of a user and a sound source to cause the user to appropriately detect the distance from the user to the sound source. As described above, the information processing method can prevent a delay that may occur in an output sound, while causing a user to appropriately detect a distance from the user to a sound source.

For example, the information processing method may further include: generating an output signal indicating a sound to be output from a loudspeaker by performing the three-dimensional audio processing on the sound signal using the spatial resolution set; and causing the loudspeaker to output the sound indicated by the output signal by supplying the output signal generated to the loudspeaker.

According to the above-described aspect, outputting a sound based on an output signal generated by performing the three-dimensional audio processing using a spatial resolution that has been set and causing a user to hear the sound enable the user to hear an output sound that is prevented from being delayed. As described above, the information processing method can prevent a delay that may occur in an output sound, and causes a user to hear the output sound that is prevented from being delayed.

For example, the three-dimensional audio processing may include rendering processing that, using the first position and orientation information and the second position and orientation information, generates a sound that the user is to hear within a space including the sound source, according to the positional relationship between the head of the user and the sound source, and the spatial resolution may be a spatial resolution for the rendering processing.

According to the above-described aspect, a spatial resolution for rendering processing as the three-dimensional audio processing is set. Therefore, the above-described information processing method can prevent a delay that may occur in an output sound.

An information processing device according to one aspect of the present disclosure includes: a decoder that obtains a stream including (i) first position and orientation information indicating a position and an orientation of a sound source and (ii) a sound signal indicating a sound that the sound source outputs; an obtainer that obtains second position and orientation information indicating a position and an orientation of a head of a user; and a setter that, using the first position and orientation information and the second position and orientation information, sets a spatial resolution for three-dimensional audio processing to be performed on the sound signal, according to a positional relationship between the head of the user and the sound source.

The above-described aspect produces the same advantageous effects as the above-described information processing method.

In addition, a recording medium according to one aspect of the present disclosure is a non-transitory computer-readable recording medium having recorded thereon a program for causing a computer to execute the above-described information processing method.

The above-described aspect produces the same advantageous effects as the above-described information processing method.

Note that these comprehensive or specific aspects may be implemented by a system, a device, an integrated circuit, a computer program, or a recording medium such as a computer-readable CD-ROM, or by any optional combination of systems, devices, integrated circuits, computer programs, or recording media.

Hereinafter, embodiments will be described in detail with reference to the drawings.

Note that the embodiments below each describe a general or specific example. The numerical values, shapes, materials, elements, the arrangement and connection of the elements, steps, orders of the steps, etc. presented in the embodiments below are mere examples, and are not intended to limit the present disclosure. Furthermore, among the elements in the embodiments below, those not recited in any one of the independent claims representing the most generic concepts will be described as optional elements.

Embodiment

This embodiment describes an information processing method, an information processing device, etc. which prevent a delay that may occur in an output sound.

FIG. 1 is a diagram illustrating an example of a positional relationship between user U and sound source 5 according to an embodiment.

FIG. 1 illustrates user U who is present in space S and sound source 5 that user U is aware of. Space S in FIG. 1 is illustrated as a flat surface including the x axis and y axis, but space S also includes an extension in the z axis direction. The same applies throughout the embodiment.

Space S may be provided with a wall surface or an object. The wall surface includes a ceiling and also a floor.

Information processing device 10 performs three-dimensional audio processing that is digital sound processing, based on a stream including a sound signal indicating a sound that sound source 5 outputs, to generate a sound signal caused to be heard by user U. The stream further includes position and orientation information including the position and orientation of sound source 5 in space S. The sound signal generated by information processing device 10 is output through a loudspeaker as a sound, and the sound is heard by user U. The loudspeaker is assumed to be a loudspeaker included in earphones or headphones worn by user U, but the loudspeaker is not limited to the foregoing examples.

Sound source 5 is a virtual sound source (typically called a sound image), namely an object that user U who has heard the sound signal generated based on the stream is aware of as a sound source. In other words, sound source 5 is not a generation source that actually generates a sound. Note that although a person is illustrated as sound source 5 in FIG. 1, sound source 5 is not limited to humans. Sound source 5 may be any optional sound source.

User U hears a sound that is based on the sound signal generated by information processing device 10 and is output from a loudspeaker.

The sound output from the loudspeaker based on the sound signal generated by information processing device 10 is heard by each of the left and right ears of user U. Information processing device provides an appropriate time difference or an appropriate phase difference (to be also stated as a time difference, etc.) for the sound heard by each of the left and right ears of user U. User U detects a direction of sound source 5 for user U, based on the time difference, etc. of the sound heard by each of the left and right ears.

In addition, information processing device 10 causes a sound heard by each of the left and right ears of user U to include a sound (to be stated as a direct sound) corresponding to a sound directly arriving from sound source 5 and a sound (to be stated as a reflected sound) corresponding to a sound output by sound source 5 and is reflected off a wall surface before arrival. User U detects a distance from user U to sound source 5 based on a time interval between a direct sound and a reflected sound included in the sound heard.

In three-dimensional audio processing to be performed by information processing device 10, a timing of an arrival of each of a direct sound and a reflected sound at user U and an amplitude and a phase of each of the direct sound and the reflected sound are calculated based on the sound signal included in the above-described stream. The direct sound and the reflected sound are then synthesized to generate a sound signal (to be stated as an output signal) indicating a sound to be output from a loudspeaker. The three-dimensional audio processing may include a relatively large scale of computation processing.

When the number of sound signals included in the stream is relatively great or when a spatial resolution for the three-dimensional audio processing is relatively high, information processing device 10 requires a relatively long time for computation processing, and thus delays in generating and outputting an output signal may occur. One of means of preventing a delay that may occur in an output signal is to decrease the spatial resolution for the three-dimensional audio processing. However, a decrease in the spatial resolution for the three-dimensional audio processing may reduce the quality of a sound to be heard by user U. As described above, a high-quality sound to be heard by user U and an amount of the computation processing are in a trade-off relationship.

Information processing device 10 uses a distance between user U and sound source 5 to adjust a parameter of the three-dimensional audio processing for contributing to a reduction in a processing load of the three-dimensional audio processing. For example, information processing device 10 decreases a spatial resolution that is a parameter of the three-dimensional audio processing to reduce a processing load of the three-dimensional audio processing.

Figure 2:
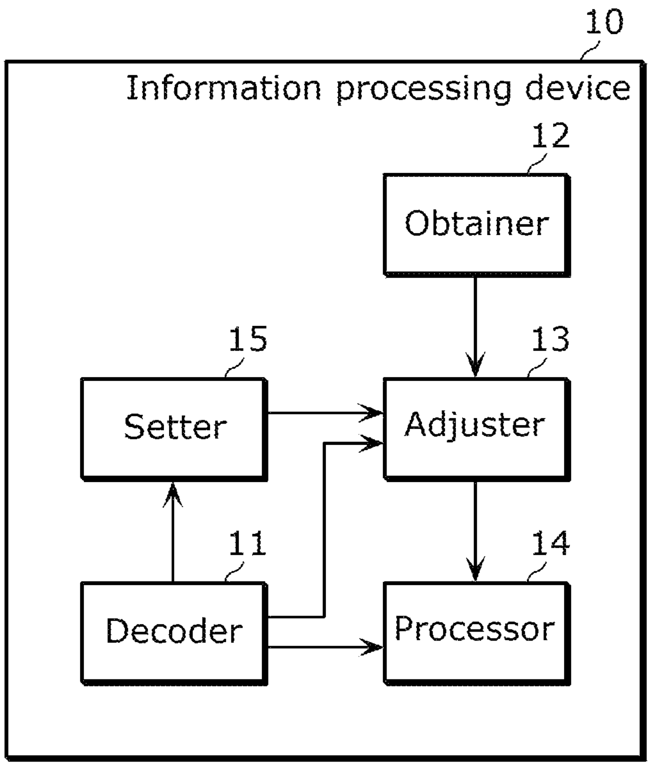
FIG. 2 is a block diagram illustrating a functional configuration of an information processing device according to the embodiment.

FIG. 2 is a block diagram illustrating a functional configuration of information processing device 10 according to the embodiment.

As illustrated in FIG. 2, information processing device 10 includes, as functional units, decoder 11, obtainer 12, adjuster 13, processor 14, and setter 15. These functional units included in information processing device 10 may be implemented by a processor (e.g., a central processing unit (CPU) not illustrated) executing a predetermined program using memory (not illustrated).

Decoder 11 is a functional unit that decodes a stream. The stream includes, specifically, position and orientation information (corresponding to first position and orientation information) indicating the position and orientation of sound source 5 in space S and a sound signal indicating a sound that sound source 5 outputs. The stream may include type information indicating whether the sound that sound source 5 outputs is a human voice or not. Here, the voice indicates a human utterance.

Decoder 11 supplies the sound signal obtained by decoding the stream to processor 14. In addition, decoder 11 supplies the position and orientation information obtained by decoding the stream to adjuster 13. Note that the stream may be obtained by information processing device 10 from an external device or may be prestored in a storage device included in information processing device 10.

The stream is a stream encoded in a predetermined format. For example, the stream is encoded in a format of MPEG-H 3D Audio (ISO/IEC 23008-3), which may be simply called MPEG-H 3D Audio.

The position and orientation information indicating the position and orientation of sound source 5 is, to be more specific, information on six degrees of freedom including coordinates (x, y, and z) of sound source 5 in the three axial directions and angles (the yaw angle, pitch angle, and roll angle) of sound source 5 with respect to the three axes. The position and orientation information on sound source 5 can identify the position and orientation of sound source 5. Note that the coordinates are coordinates in a coordinate system that are appropriately set. An orientation is an angle with respect to the three axes which indicates a predetermined direction (to be stated as a reference direction) predetermined for sound source 5. The reference direction may be a direction toward which sound source 5 outputs a sound or may be any direction that can be uniquely determined for sound source 5.

The stream may include, for each of one or more sound sources position and orientation information indicating the position and orientation of sound source 5 and a sound signal indicating a sound that sound source 5 outputs.

Obtainer 12 is a functional unit that obtains the position and orientation of the head of user U in space S. Obtainer 12 obtains, using a sensor etc., position and orientation information (second position and orientation information) including information (to be stated as position information) indicating the position of the head of user U and information (to be stated as orientation information) indicating the orientation of the head of user U. The position and orientation information on the head of user U is, to be more specific, information on six degrees of freedom including coordinates (x, y, and z) of the head of user U in the three axial directions and angles (the yaw angle, pitch angle, or roll angle) of the head of user U with respect to the three axes. The position and orientation information on the head of user U can identify the position and orientation of the head of user U. Note that the coordinates are coordinates in a coordinate system common to the coordinate system determined for sound source 5. The position may be determined as a position in a predetermined positional relationship from a predetermined position (e.g., the origin point) in the coordinate system. The orientation is an angle with respect to the three axes which indicates the direction toward which the head of user U faces.

The sensor, etc. are an inertial measurement unit (IMU), an accelerometer, a gyroscope, and/or a magnetometric sensor, or a combination thereof. The sensor, etc. are assumed to be worn on the head of user U. The sensor, etc. may be fixed to earphones or headphones worn by user U.

Adjuster 13 is a functional unit that adjusts the position and orientation information on user U in space S using a parameter of the three-dimensional audio processing performed by processor 14.

Adjuster 13 obtains, from setter 15, a spatial resolution that is a parameter of the three-dimensional audio processing. Adjuster 13 then adjusts the position information on the head of user U obtained by obtainer 12 by changing the position information to any value of an integer multiple of the spatial resolution. When the position information is changed, adjuster 13 may adopt, from among a plurality of values that are integer multiples of the spatial resolution, a value closest to the position information of the head of user U obtained by obtainer 12. Adjuster 13 supplies, to processor 14, the adjusted position information on the head of user U and the orientation information on the head of user U.

Processor 14 is a functional unit that performs, on the sound signal obtained by decoder 11, spatialization that is digital acoustic processing. Processor 14 includes a plurality of filters used for the three-dimensional audio processing. The filters are used for computations performed for adjusting the amplitude and phase of the sound signal for each of frequencies.

Processor 14 obtains, from adjuster 13, parameters (i.e., a spatial resolution and a time response length) used for the three-dimensional audio processing, and performs the three-dimensional audio processing using the obtained parameters. Processor 14 calculates, in the three-dimensional audio processing, propagation paths of a direct sound and a reflected sound that arrive from sound source 5 to user U and timings of the arrival of the direct sound and reflected sound at user U. Processor 14 also calculates the amplitude and phase of sounds that arrive at user U by applying, for each of ranges of angle directions with respect to the head of user U, a filter according to the range to a signal indicating a sound (a direct sound and a reflected sound) that arrives at user U from the range.

Setter 15 is a functional unit that sets a parameter of the three-dimensional audio processing to be performed by processor 14. The parameter of three-dimensional audio processing may consist of a spatial resolution and a time response length for the three-dimensional audio processing.

Using the position and orientation information on sound source 5 in space S and the position and orientation information on user U obtained by obtainer 12, setter 15 sets a spatial resolution that is a parameter of the three-dimensional audio processing according to a positional relationship between the head of user U and sound source 5. Moreover, setter 15 may further set, according to the above-mentioned positional relationship, a time response length that is a parameter of the three-dimensional audio processing. Setter 15 supplies the set parameter to adjuster 13.

Distance D between user U and sound source 5 may be used for setting parameters. Distance D may be expressed as shown in [Math. 3] using [Math. 1] and [Math. 2] as follows (see FIG. 1).

$$\vec{r} \quad \text{[Math. 1]}$$

The above shows a vector indicating the position and orientation of sound source 5.

$$\vec{r_0} \quad \text{[Math. 2]}$$

The above shows a vector indicating the position and orientation of user U.

$$D=|\vec{r}-\vec{r_0}| \quad \text{[Math. 3]}$$

In setting of a spatial resolution, setter 15 may set a spatial resolution lower for a larger distance D between the head of user U and sound source 5 in space S.

Moreover, in setting of a time response length, setter 15 may set a time response length greater for a larger distance D between the head of user U and sound source 5 in space S.

Spatial resolution of three-dimensional audio processing will be described with reference to FIG. 3, FIG. 4, and FIG. 5.

Figure 3:
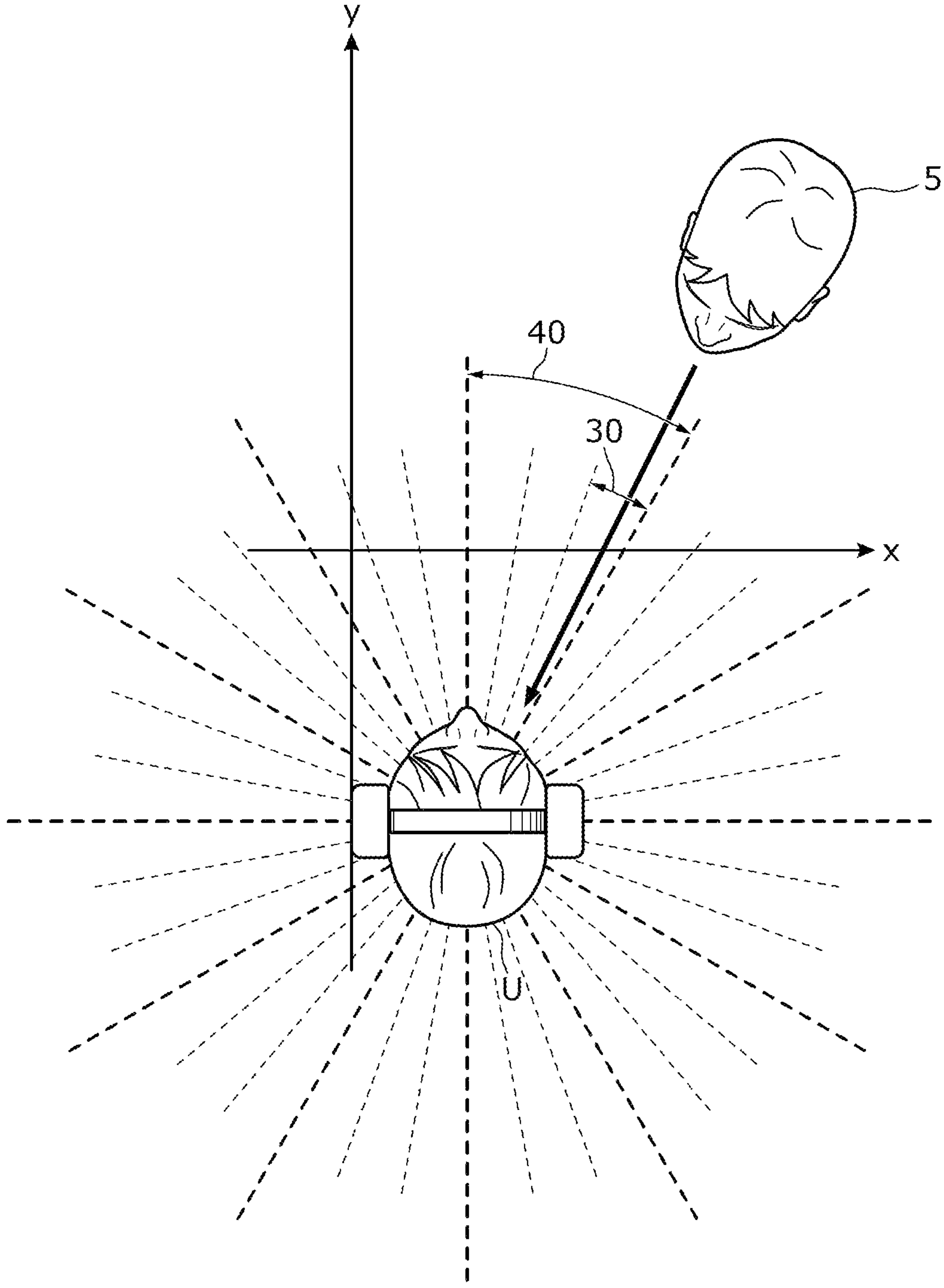
FIG. 3 is a first diagram illustrating spatial resolutions for three-dimensional audio processing according to the embodiment.
Figure 4:
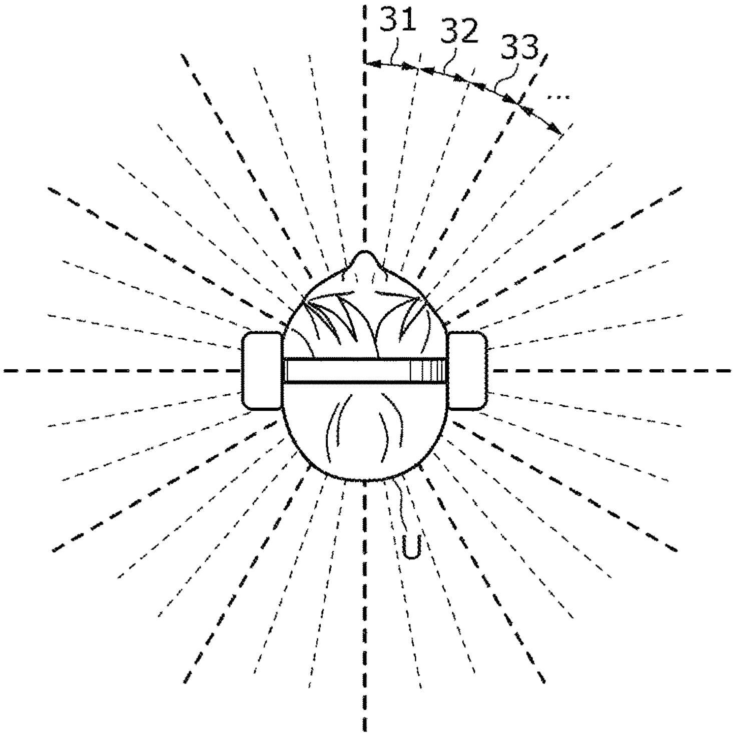
FIG. 4 is a second diagram illustrating spatial resolutions for the three-dimensional audio processing according to the embodiment.
Figure 5:
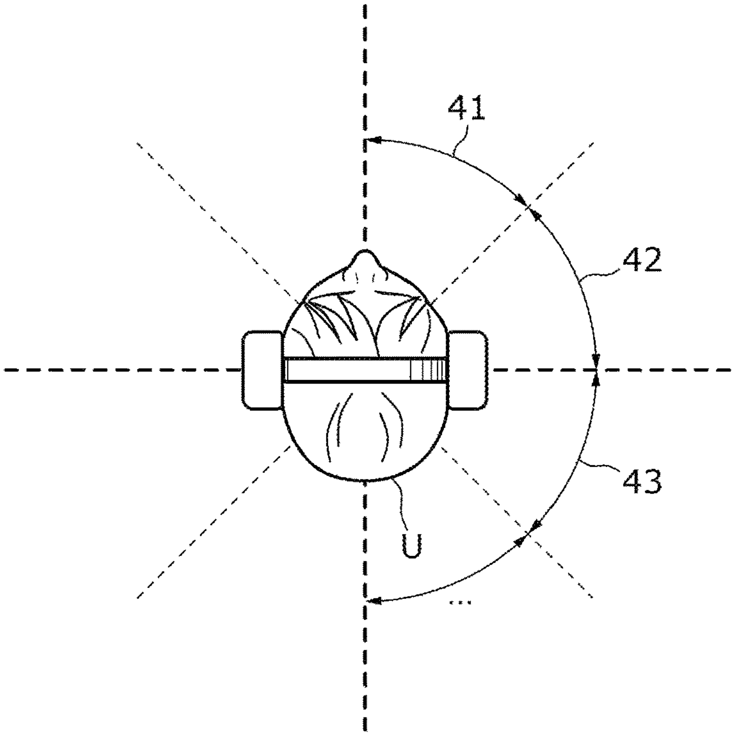
FIG. 5 is a third diagram illustrating spatial resolutions for the three-dimensional audio processing according to the embodiment.

FIG. 3, FIG. 4, and FIG. 5 each are a diagram illustrating spatial resolutions for the three-dimensional audio processing according to the embodiment.

As illustrated in FIG. 3, a spatial resolution for the three-dimensional audio processing is a resolution of a range of an angle direction with respect to user U.

When a spatial resolution is relatively high in the three-dimensional audio processing, processor 14 applies, for each of relatively narrow angular ranges (e.g., an angular range of 30), a filter for a sound signal that arrives at user U from the angular range. Meanwhile, when a spatial resolution is relatively low in the three-dimensional audio processing, processor 14 applies, for each of relatively wide angular ranges (e.g., an angular range of 40), a filter for a sound signal that arrives at user U from the angular range.

As described above, a high spatial resolution corresponds to a narrow angular range. Alternatively, a low spatial resolution corresponds to a wide angular range. An angular range is equivalent to a unit to which the same filter is applied.

To be more specific, when a spatial resolution is relatively high, processor 14 applies, for each of angular ranges 31, 32, 33 and so on with respect to user U, a filter that corresponds to the angular range to a sound signal to calculate a sound signal indicating a sound arriving at user U from each of angular ranges 31, 32, 33 and so on (see FIG. 4). The sound arriving at user U from each of angular ranges 31, 32, 33 and so on may consist of a direct sound and a reflected sound arriving from sound source 5 to user U.

Moreover, when a spatial resolution is relatively low, processor 14 applies, for each of angular ranges 41, 42, 43 and so on with respect to user U, a filter that corresponds to the angular range to a sound signal to calculate a sound signal indicating a sound arriving at user U from each of angular ranges 41, 42, 43 and so on (see FIG. The sound arriving at user U from each of angular ranges 41, 42, 43 and so on may consist of a direct sound and a reflected sound arriving from sound source 5 to user U.

A time response length for the three-dimensional audio processing will be described with reference to FIG. 6.

Figures 6, 7, 8, 9:
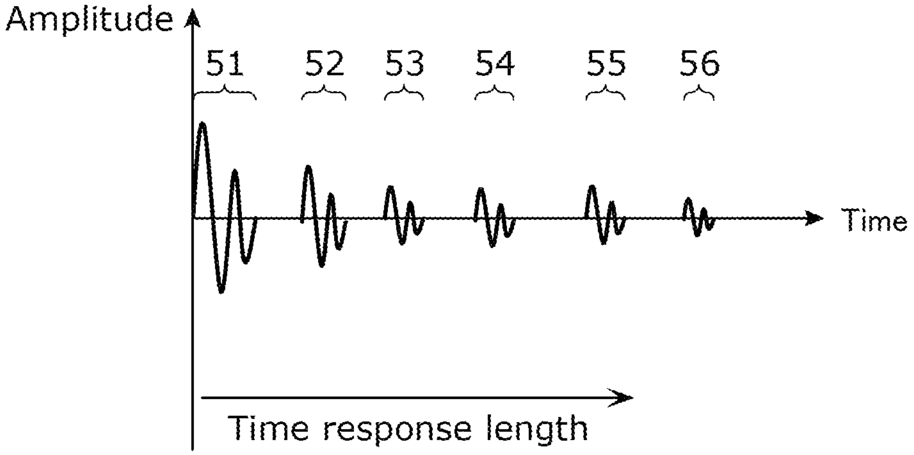
FIG. 6 is a diagram illustrating time response lengths for the three-dimensional audio processing according to the embodiment.
FIG. 7 is a diagram illustrating a first example of parameters of the three-dimensional audio processing according to the embodiment.
FIG. 8 is a diagram illustrating a second example of a parameter of the three-dimensional audio processing according to the embodiment.
FIG. 9 is a diagram illustrating a third example of the parameter of the three-dimensional audio processing according to the embodiment.

FIG. 6 is a diagram illustrating time response lengths for the three-dimensional audio processing according to the embodiment.

FIG. 6 shows a sound signal generated in the three-dimensional audio processing. The sound signal includes waveform 51 corresponding to a direct sound that arrives at user U from sound source 5, and waveforms 52, 53, 54, 55, and 56 corresponding to reflected sounds that arrive at user U from sound source 5. Each of waveforms 52, 53, 54, 55, and 56 corresponding to the reflected sounds is delayed from the direct sound by a delay time determined based on the positional relationship between sound source 5, user U, and a wall surface in space S. Moreover, the amplitude of each of waveforms 52, 53, 54, 55, and 56 is reduced due to a propagation distance and reflection off the wall surface. A delay time is determined in a range of about 10 msec to about 100 msec.

A time response length is an indicator showing a degree of magnitude of the above-described delay time. A delay time increases as a time response length increases. Alternatively, a delay time reduces as a time response length reduces.

Note that a time response length is strictly an indicator showing the magnitude of a delay time, and does not indicate a delay time of a waveform corresponding to a reflected sound. For example, although the time interval from waveform 51 to waveform 55 and the time response length from waveform 51 to waveform 55 are substantially equal in FIG. 6, the time interval from waveform 51 to waveform 54 and the time response length from waveform 51 to waveform 54 may be substantially equal. Moreover, the time interval from waveform 51 to waveform 56 and the time response length from waveform 51 to waveform 56 may be substantially equal.

Hereinafter, an example of setting of a spatial resolution and a time response length will be described with reference to FIG. 7.

FIG. 7 is a diagram illustrating a first example of parameters of the three-dimensional audio processing according to the embodiment.

FIG. 7 illustrates an association table showing an association between (i) a spatial resolution and a time response length which are parameters of the three-dimensional audio processing and (ii) each of ranges of distance D between user U and sound source 5.

In FIG. 7, a lower spatial resolution is associated with a larger distance D between the head of user U and sound source 5. Moreover, a greater time response length is associated with a larger distance D between the head of user U and sound source 5.

For example, distance D of less than 1 m is associated with a spatial resolution of 10 degrees and a time response length of 10 msec.

Likewise, distance D of more than or equal to 1 m to less than 3 m, distance D of more than or equal to 3 m to less than 20 m, and distance D of more than or equal to 20 m are respectively associated with a spatial resolution of 30 degrees, a spatial resolution of 45 degrees, and a spatial resolution of 90 degrees and a time response length of 50 msec, a time response length of 200 msec, and a time response length of 1 sec.

Setter 15 holds the association table of distances D and spatial resolutions illustrated in FIG. 7, and supplies the association table to adjuster 13. Adjuster 13 consults the above-described association table supplied, and obtains a spatial resolution and a time response length associated with distance D between the head of user U and sound source 5 which is obtained from obtainer 12.

As described above, setter 15 sets a lower spatial resolution, namely a value indicating the lower spatial resolution, for a larger distance D between the head of user U and sound source 5 in space S. In addition, setter 15 sets a greater time response length, namely a value indicating the greater time response length, for a larger distance D between the head of user U and sound source 5 in space S.

Note that setter 15 may change a spatial resolution depending on whether a sound indicated by a sound signal is a human voice or not in the setting of a spatial resolution. Information processing device 10 changing a spatial resolution depending on whether a sound indicated by a sound signal is a human voice or not may contribute to more accurate performance of the three-dimensional audio processing on a human voice.

Specifically, when type information indicates that a sound indicated by a sound signal is a human voice in the setting of a spatial resolution, setter 15 may increase the spatial resolution. In other words, a value indicating a higher spatial resolution may be set. Note that when a spatial resolution has been already set at the time at which setter 15 intends to set a spatial resolution, setter 15 may revise the spatial resolution that has been already set to a value indicating a higher spatial resolution than a value indicated by the spatial resolution that has been already set.

Moreover, when type information indicates that a sound indicated by a sound signal is not a human voice in the setting of a spatial resolution, setter 15 may decrease the spatial resolution. In other words, a value indicating a lower spatial resolution may be set. Note that when a spatial resolution has been already set at a time at which setter 15 intends to set a spatial resolution, setter 15 may revise the spatial resolution that has been already set to a value indicating a lower spatial resolution than a value indicated by the spatial resolution that has been already set.

In addition, setter 15 may change a spatial resolution according to the number of sound sources included in a stream in the setting of a spatial resolution.

Specifically, setter 15 may set a spatial resolution lower for a greater number of sound sources included in a stream. In other words, a value indicating a lower spatial resolution may be set. Note that when a spatial resolution has been already set at a time at which setter 15 intends to set a spatial resolution, setter 15 may revise the spatial resolution that has been already set to a value indicating a lower spatial resolution than a value indicated by the spatial resolution that has been already set.

FIG. 8 is a diagram illustrating a second example of a parameter of the three-dimensional audio processing according to the embodiment. FIG. 8 illustrates an association table showing an association between a spatial resolution and each of ranges of distance D between user U and sound source 5. FIG. 8 is one example of an association table showing values of the parameter which are revised by setter 15 from the values of the parameter shown in FIG. 7.

In FIG. 8, illustrations of time response lengths are omitted.

In FIG. 8, distance D of less than 1 m is associated with a spatial resolution of 5 degrees.

Likewise, distance D of more than or equal to 1 m to less than 3 m, distance D of more than or equal to 3 m to less than 20 m, and distance D of more than or equal to 20 m are associated with a spatial resolution of 15 degrees, a spatial resolution of 22.5 degrees, and a spatial resolution of 45 degrees, respectively. The values of spatial resolutions shown in FIG. 8 for respective values of distances D are half times the values of the spatial resolutions shown in FIG. 7. In other words, for each value of distance D, the spatial resolution shown in FIG. 8 has a spatial resolution twice as high as the spatial resolution shown in FIG. 7.

For example, when type information indicates that a sound signal indicates a human voice, setter 15 changes an association table used for the three-dimensional audio processing from the association table shown in FIG. 7 to the association table shown in FIG. 8. With this, setter 15 can increase a spatial resolution when the type information indicates that a sound indicated by the sound signal is a human voice.

FIG. 9 is a diagram illustrating a third example of the parameter of the three-dimensional audio processing according to the embodiment.

FIG. 9 illustrates an association table showing an association between a spatial resolution and each of ranges of distance D between user U and sound source 5. FIG. 9 illustrates values of the parameter which are revised by setter 15 from the values of the parameter shown in FIG. 7.

In the same manner as FIG. 8, illustrations of time response lengths are omitted from FIG. 9.

In FIG. 9, distance D of less than 1 m is associated with a spatial resolution of 20 degrees.

Likewise, distance D of more than or equal to 1 m to less than 3 m, distance D of more than or equal to 3 m to less than 20 m, and distance D of more than or equal to 20 m are associated with a spatial resolution of 60 degrees, a spatial resolution of 90 degrees, and a spatial resolution of 180 degrees, respectively. In other words, values of the spatial resolutions shown in FIG. 9 for respective values of distances D are twice the values of the spatial resolutions shown in FIG. 7. Specifically, for each value of distance D, the spatial resolution shown in FIG. 9 has a spatial resolution half the spatial resolution shown in FIG. 7.

For example, when type information indicates that a sound signal does not indicate a human voice, setter 15 changes an association table used for the three-dimensional audio processing from the association table shown in FIG. 7 to the association table shown in FIG. 9. With this, setter 15 can decrease a spatial resolution when the type information indicates that a sound indicated by the sound signal is not a human voice.

Figure 10:
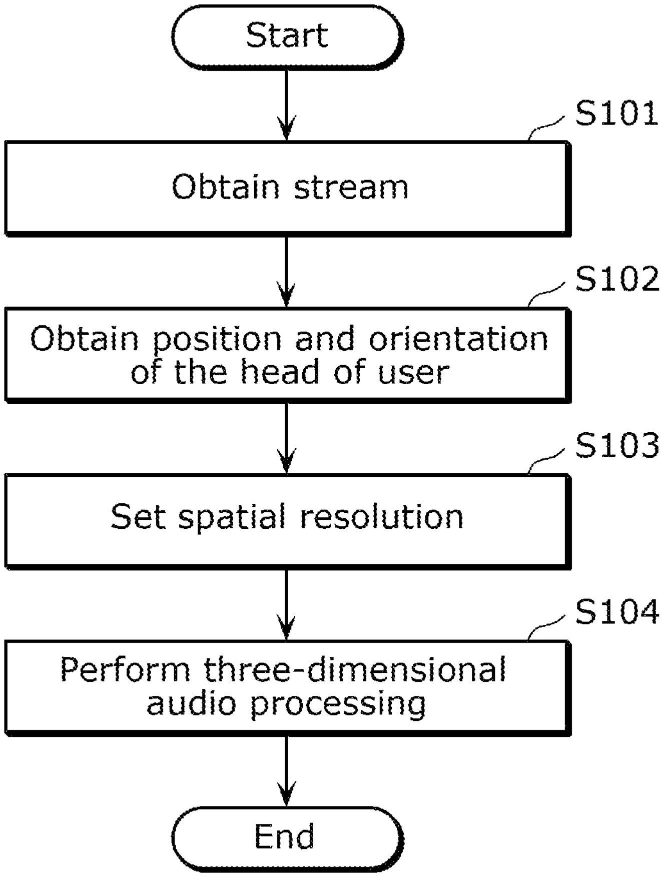
FIG. 10 is a flowchart illustrating processing performed by the information processing device according to the embodiment.

FIG. 10 is a flowchart illustrating processing performed by information processing device 10 according to the embodiment.

As illustrated in FIG. 10, decoder 11 obtains a stream in step S101. The stream includes information (corresponding to first position and orientation information) indicating the position and orientation of sound source 5 and a sound signal indicating a sound that sound source 5 outputs.

In step S102, obtainer 12 obtains information (corresponding to second position and orientation information) indicating the position and orientation of the head of user U.

In step S103, using the first position and orientation information and the second position and orientation information, setter 15 sets a spatial resolution for the three-dimensional audio processing to be performed on the sound signal, according to a positional relationship between the head of user U and sound source 5.

In step S104, processor 14 performs the three-dimensional audio processing using the spatial resolution set in step S103 to generate and output a sound signal to be output by a loudspeaker. The sound signal output is assumed to be transmitted to the loudspeaker, output as a sound, and heard by user U.

With this, information processing device 10 can prevent a delay that may occur in an output sound.

As has been described above, information processing device 10 according to the embodiment sets a spatial resolution for three-dimensional audio processing according to a positional relationship between the head of a user and a sound source. Accordingly, the scale of computations required for the three-dimensional audio processing can be adjusted. For this reason, when the scale of computations required for the three-dimensional audio processing is relatively large, the spatial resolution is decreased to reduce the scale of computations and the time required for performing the three-dimensional audio processing. As a result, a delay that may occur in an output sound can be prevented. Accordingly, the above-described information processing method can prevent a delay that may occur in an output sound.

In addition, information processing device 10 sets a spatial resolution for the three-dimensional audio processing lower for a larger distance between the head of the user and the sound source to reduce the scale of computations required for the three-dimensional audio processing. As a result, a delay that may occur in an output sound can be prevented. Accordingly, the above-described information processing method can more readily prevent a delay that may occur in an output sound.

Moreover, information processing device 10 sets a spatial resolution for the three-dimensional audio processing to be performed on a human voice high to enable a user to hear the human voice in higher quality as compared to a sound other than a human voice. This may contribute to improvement in accuracy of a sound image position of a human voice, since it is likely that the sound image position of a human voice is required to have relatively high accuracy as compared to sounds other than a human voice. Accordingly, the above-described information processing method can prevent a delay that may occur in an output sound, while improving the quality of a human voice included in the output sound.

In addition, information processing device 10 sets a spatial resolution for the three-dimensional audio processing low for the three-dimensional audio processing to be performed on a sound other than a human voice to reduce the scale of computations required for the three-dimensional audio processing to be performed on a sound other than a human voice. As a result, a delay that may occur in an output sound can be prevented. A reduction in accuracy of a sound image position of a sound other than a human voice may contribute to preventing a delay that may occur in an output sound, since it is unlikely that the sound image position of a sound other than a human voice is required to have high accuracy as compared to a human voice. Accordingly, the above-described information processing method can more readily prevent a delay that may occur in an output sound.

Moreover, information processing device 10 sets a spatial resolution lower for a greater number of sound sources included in a stream to reduce the scale of computations required for the three-dimensional audio processing. As a result, a delay that may occur in an output sound can be prevented. Accordingly, the above-described information processing method can more readily prevent a delay that may occur in an output sound.

In addition, information processing device 10 sets a time response length for the three-dimensional audio processing according to a positional relationship between the head of a user and a sound source. Accordingly, it is possible to cause the user to appropriately detect the distance from the user to the sound source. As described above, the above-described information processing method can prevent a delay that may occur in an output sound, while causing a user to appropriately detect a distance from the user to a sound source.

Moreover, information processing device 10 sets a time response length for the three-dimensional audio processing greater for a larger distance between the head of a user and a sound source to cause the user to appropriately detect the distance from the user to the sound source. Accordingly, the above-described information processing method can prevent a delay that may occur in an output sound, while causing a user to more appropriately detect a distance from the user to a sound source.

In addition, information processing device 10 outputs a sound based on an output signal generated through the three-dimensional audio processing using a spatial resolution that is set and causes a user to hear the sound to enable the user to hear the output sound that is prevented from being delayed. Accordingly, the above-described information processing method can prevent a delay that may occur in an output sound, and causes a user to hear an output sound that is prevented from being delayed.

Moreover, information processing device 10 sets a spatial resolution for rendering processing as the three-dimensional audio processing. Accordingly, the above-described information processing method can prevent a delay that may occur in an output sound.

It should be noted that each of the elements in the above-described embodiments may be configured as a dedicated hardware product or may be implemented by executing a software program suitable for the element. Each element may be implemented as a result of a program execution unit, such as a central processing unit (CPU), a processor or the like, loading and executing a software program stored in a storage medium such as a hard disk or a semiconductor memory. Software that implements the information processing device according to the above-described embodiments is a program as described below.

The above-mentioned program is, specifically, a program for causing a computer to execute an information processing method including: obtaining a stream including (i) first position and orientation information indicating a position and an orientation of a sound source and (ii) a sound signal indicating a sound that the sound source outputs; obtaining second position and orientation information indicating a position and an orientation of a head of a user; and setting a spatial resolution for three-dimensional audio processing to be performed on the sound signal, according to a positional relationship between the head of the user and the sound source and using the first position and orientation information and the second position and orientation information.

The information processing device according to one or more aspects has been hereinbefore described based on the embodiments, but the present disclosure is not limited to these embodiments. The scope of the one or more aspects of the present disclosure may encompass embodiments as a result of making, to the embodiments, various modifications that may be conceived by those skilled in the art and combining elements in different embodiments, as long as the resultant embodiments do not depart from the scope of the present disclosure.

INDUSTRIAL APPLICABILITY

The present disclosure is applicable to information processing devices that perform three-dimensional audio processing.

The invention claimed is:

1. An information processing method comprising:
obtaining a sound signal and first information related to a sound emitted by a sound source; and
setting a filter to be applied to the sound signal based on the first information including type information of the sound, wherein
the type information indicates whether a type of the sound is a human voice, and
in the setting of the filter, whether the type of the sound is a human voice is determined, and the filter is set such that the filter set when the type of the sound is determined to be a human voice is different from the filter set when the type of the sound is determined not to be a human voice.

2. The information processing method according to claim 1, further comprising:
calculating an amplitude and a phase of at least one sound to be output, by applying the filter to the sound signal.

3. The information processing method according to claim 1, wherein
the filter is used to spatialize the sound signal.

4. The information processing method according to claim 1, wherein
the first information further includes a first position that is a position of the sound source,
the information processing method further comprises obtaining a second position that is a position of a user, and
in the setting of the filter, the filter to be applied to the sound signal is set based on a positional relationship between the first position and the second position.

5. The information processing method according claim 4, further comprising:
calculating a plurality of sounds that are to arrive at the second position, based on the first position and the second position; and
calculating an arrival angle at which each of the plurality of sounds arrive at the second position, wherein
in the setting of the filter, a filter to be applied to each of the plurality of sounds is set based on the arrival angle.

6. The information processing method according claim 5, wherein
the plurality of sounds include a direct sound and a reflected sound.

7. The information processing method according to claim 4, wherein
in the setting of the filter, the filter is set such that a same filter is applied to a greater number of sounds as a distance between a head of the user and the sound source is larger.

8. The information processing method according to claim 1, wherein
in the setting of the filter, the filter is set such that a same filter is applied to a smaller number of sounds when the type information indicates that the sound is a human voice than when the type information does not indicate that the sound is a human voice.

9. The information processing method according to claim 1, wherein
the sound source comprises a plurality of sound sources,
the first information includes information on the plurality of sound sources, and
in the setting of the filter, the filter is set such that a same filter is applied to a greater number of sounds as a total number of the plurality of sound sources is greater.

10. An information processing device comprising:
a processor; and
memory,
wherein using the memory, the processor:
obtains a sound signal and first information related to a sound emitted by a sound source; and
sets a filter to be applied to the sound signal based on the first information including type information of the sound, wherein
the type information indicates whether a type of the sound is a human voice, and
in the setting of the filter, whether the type of the sound is a human voice is determined, and the filter is set such that the filter set when the type of the sound is determined to be a human voice is different from the filter set when the type of the sound is determined not to be a human voice.

11. A non-transitory computer-readable recording medium having recorded thereon a computer program for causing a computer to execute the information processing method according to claim 1.

* * * * *